Figure 6:
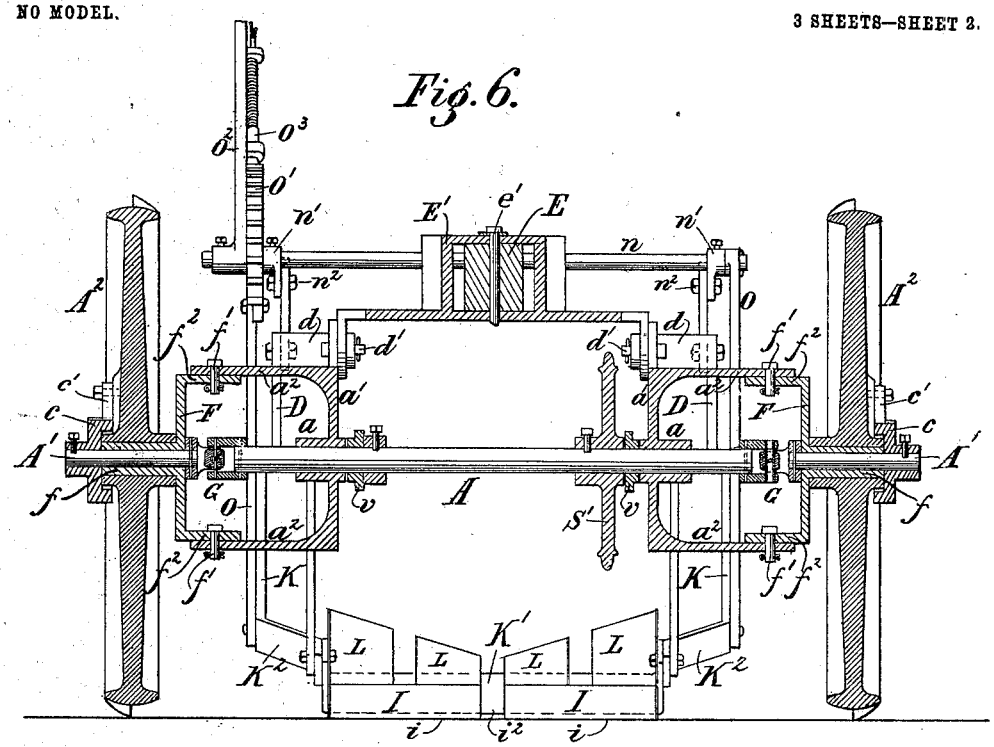

No. 735,216. PATENTED AUG. 4, 1903.
C. J. CUMMINGS.
POTATO DIGGER.
APPLICATION FILED JAN. 6, 1902.
NO MODEL. 3 SHEETS—SHEET 1.
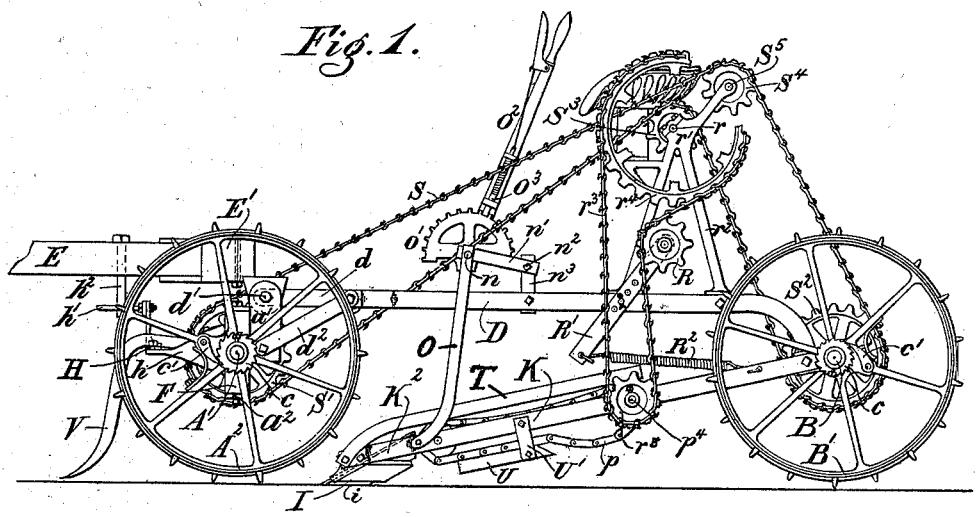
Fig. 1.
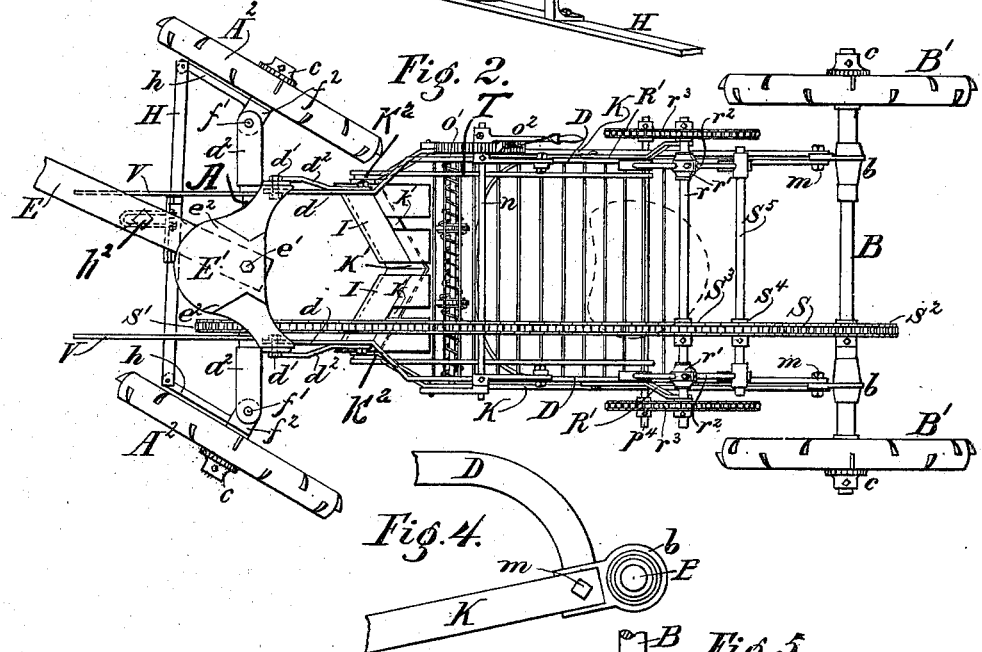
Fig. 3.
Fig. 2.
Fig. 4.
Fig. 5.
Witnesses:
Inventor.
Chas. J. Cummings.
By Wilhelm Bonner
Attorneys.

No. 735,216. PATENTED AUG. 4, 1903.
C. J. CUMMINGS.
POTATO DIGGER.
APPLICATION FILED JAN. 6, 1902.
NO MODEL. 3 SHEETS—SHEET 3.
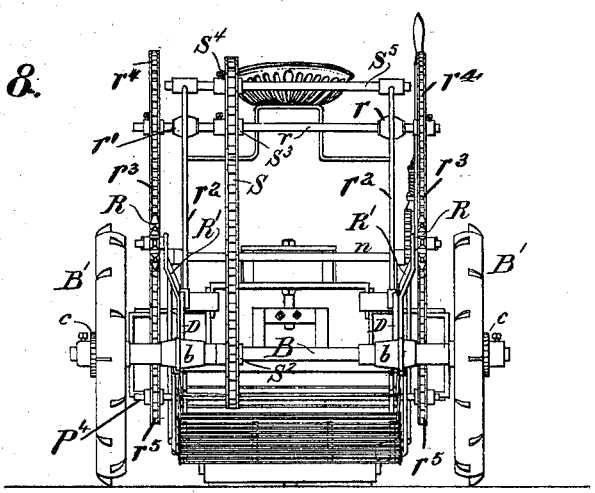
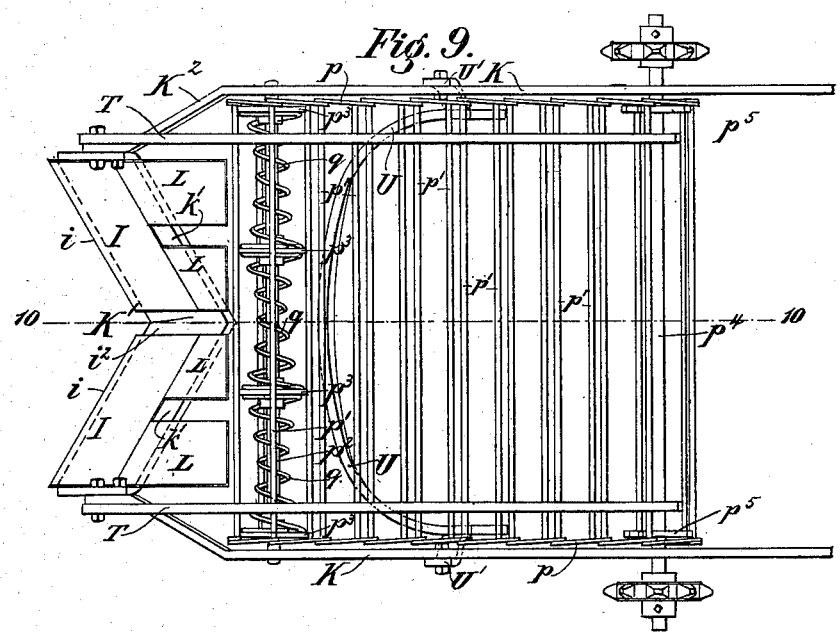
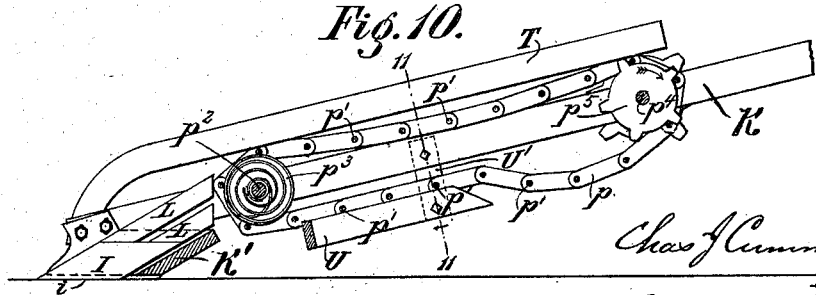
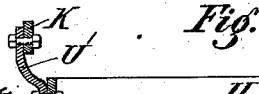

No. 735,216. Patented August 4, 1903.

UNITED STATES PATENT OFFICE.

CHARLES J. CUMMINGS, OF TULLY, NEW YORK.

POTATO-DIGGER.

SPECIFICATION forming part of Letters Patent No. 735,216, dated August 4, 1903.

Application filed January 6, 1902. Serial No. 88,521. (No model.)

*To all whom it may concern:*

Be it known that I, CHARLES J. CUMMINGS, a citizen of the United States, residing at Tully, in the county of Onondaga and State of New York, have invented new and useful Improvements in Potato-Diggers, of which the following is a specification.

This invention relates to that class of potato-diggers which are provided with a supporting-frame mounted on wheels, a plow which is suspended from said frame and by which the potatoes are dug up, and a separator which is arranged in rear of the plow and operated from said wheels, so that the potatoes, earth, and vines pass from the plow upon the separator, by which the potatoes are separated from the earth and vines and are dropped, together with the loosened vines, upon the surface of the ground, where the potatoes can be readily picked up. The wheeled frame of such potato-diggers is usually supported by two ground-wheels from which the power is derived for driving the separator. When the potatoes or other tubers or roots are planted very deep in the ground, as is the case in some localities with potatoes and as is usually the case with cassava-root, the amount of earth which is dug up by the plow and elevated and delivered to the separator, with the potatoes or other tubers or roots, is correspondingly large, and the traction afforded by two ground-wheels is often insufficient to operate the separator satisfactorily.

One object of the invention is to increase the available traction by mounting the machine on four wheels and driving the separator from all four of them.

Other objects of the invention are to improve the construction of the plow, the parts by which the plow is supported, and the separator with a view of decreasing the draft or resistance of the machine and increasing the efficiency and durability of these mechanisms.

In its general features my improved potato-digger in its most complete form is organized as follows: The front axle is composed of a main portion, which is journaled in the rigid main frame of the machine, and swiveled end portions, with which the front wheels are connected and which are coupled to the main portion by universal joints, so that the main portion of the axle is rotated by the front wheels. These end portions of the front axle are journaled in steering-frames, which are pivotally connected to the main frame in such a way that the front wheels can be turned to one side or the other in steering the machine without interfering with the driving of the main portion of the front axle from the front wheels. The plows, of which two are arranged side by side, are attached to the front end of a vertically-adjustable frame, which is hung upon the rear axle and extends forwardly therefrom. The separator, which consists of an endless traveling system of cross-bars, is arranged in rear of the plows and is driven from an intermediate shaft arranged in the main frame above the separator. This intermediate shaft is driven both from the main portion of the front axle and the rear axle, so that the traction of the front wheels, as well as of the rear wheels, is utilized.

Figure 7:
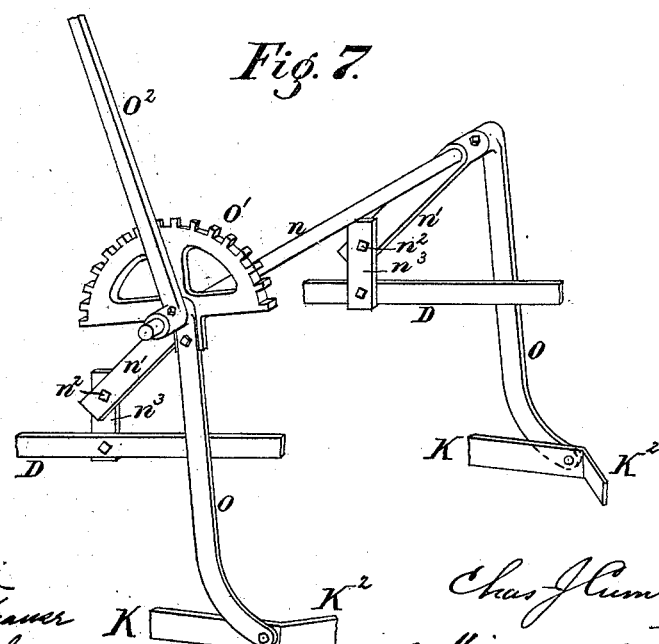

In the accompanying drawings, consisting of three sheets, Figure 1 is a side elevation of a potato-digger embodying the invention. Fig. 2 is a plan view thereof. Fig. 3 is a fragmentary perspective view of the means for connecting the pole with the steering-frames. Fig. 4 is an enlarged side elevation, and Fig. 5 is a top plan view, of one of the rear ends of the main frame. Fig. 6 is an enlarged transverse sectional elevation of the front portion of the machine. Fig. 7 is a perspective view of the mechanism for raising and lowering the plows and separator. Fig. 8 is a rear elevation of the machine. Fig. 9 is an enlarged top plan of the plows and separator. Fig. 10 is a longitudinal sectional elevation in line 10 10, Fig. 9. Fig. 11 is a transverse section in line 11 11, Fig. 10.

Like letters of reference refer to like parts in the several figures.

A represents the main portion of the front axle, A' the swiveled end or stub portions thereof, and A² the front wheels.

B represents the rear axle, and B' the rear wheels. Each wheel is connected with its axle by a ratchet-wheel $c$, secured to the axle, and a pawl $c'$, attached to the wheel, or other suitable devices, which serve to drive the axle when the wheel turns forwardly and permit the wheel to turn rearwardly on the axle. The main portion A of the front axle is journaled in bearings $a$, arranged in vertical plates $a'$, which form part of the front portion of the rigid main frame, so that the main portion of the axle is not turned in turning the machine. The rear axle B is journaled in bearings $b$, which are secured to the rear ends of the main frame. The side portions of the main frame are formed by longitudinal bars D, which have their inwardly-offset front portions $d$ rigidly secured to the frame-plates $a'$ by any suitable devices, preferably, as shown, by bolts $d'$, connecting the front ends of the side bars D to the upper portions of the frame-plates $a'$ and by brace-bars $d^2$, which extend from the offset portions $d$ of the side bars down to the lower portions of the frame-plates $a'$.

E represents the tongue or pole, and E′ a pivoted frame to which the tongue or pole is attached. This tongue or pole frame E′ is arranged transversely between the frame-plates $a'$ and is pivoted thereto by the horizontal pivot-bolts $d'$, Figs. 1, 2, and 6, so that the front end of the pole can swing vertically on these pivots. The pole is attached to this pole-frame by a vertical pin $e'$, on which it can swing laterally, and the lateral movement of the pole in the pole-frame is limited by the forwardly-diverging cheeks $e^2$ of the pole-frame or other suitable means. The transverse pivots $d'$, by which the tongue-frame is connected with the main frame, are arranged above and in rear of the front axle, whereby the draft which is applied to the tongue-frame operates to a large extent by a pushing action and tends to hold the front wheels firmly to the ground, thereby increasing the traction of the front wheels correspondingly.

F represents the steering-frames of the front wheels, and $f$ bearings projecting outwardly therefrom for carrying the front wheels and the end portions A′ of the front axle. Each steering-frame is pivoted to the adjacent front plate $a'$ of the main frame by vertical pivots $f'$, as most clearly shown in Fig. 6. Each front plate $a'$ is provided at its upper and lower ends with outwardly-projecting arms $a^2$ and each steering-frame with inwardly-projecting arms $f^2$, which engage between the arms $a^2$ of the adjacent front plate $a'$. Each vertical pivot $f'$ passes through a pair of these overlapping arms $a^2 f^2$. Each front wheel is mounted with its hub upon the bearing $f$, so as to turn thereon, and the corresponding end portion A′ of the front axle is journaled in the bearing and extends outwardly beyond the same, where it carries the ratchet-wheel $c$, to which the front wheel is connected by the pawl $c'$. Each end portion A′ of the front axle is coupled to the adjacent end of the main portion A of the axle by a universal joint G, which is arranged vertically in line with the two vertical pivots $f'$, connecting the steering-frame with the adjacent side plate, so that the steering-frame can swing horizontally on the pivot in steering the machine without interfering with the transmission of motion from the end portion A′ of the axle to the main portion A thereof.

The steering-frames of the front wheels are caused to swing together to one side or the other in turning the machine by any suitable means—for instance, by a transverse bar H, which is arranged beneath the tongue and is connected at its ends to forwardly-extending arms $h$, secured to the steering-frames, Figs. 1 and 2. The transverse bar H is provided at its middle with a forwardly-projecting loop $h'$, in which engages a pin or bolt $h^2$, extending downwardly from the tongue, so that when the latter is turned to either side the transverse bar is caused to move laterally and turn both steering-frames accordingly.

The plow or digging implement is composed of two plowshares I, which are arranged side by side in rear of the front wheels and carried at the front end of a depending frame, which is pivotally supported at its rear end in such manner that it can be adjusted up or down at its front end for raising or lowering the plow. This depending plow-frame is preferably composed of longitudinal side bars K and a front transverse bar K′, connecting these side bars. The latter carry at their rear ends the bearings $b$, in which the rear axle turns, whereby the plow-frame is pivotally supported upon the rear axle. The side bars K have inwardly-offset front portions $K^2$, which are connected near their front ends by the transverse bar K′. The latter is composed of two members $k'$, which converge from their outer sides rearwardly to their junction in the middle of the machine, as most clearly shown in Figs. 2 and 9. The front faces of the two members of this transverse bar K′ slope or incline forwardly to correspond with the angle at which the plowshares are arranged, the latter being secured upon the front faces of the two members of this bar. The lower entering edges $i$ of the two plowshares are arranged horizontally, or nearly so, and converge rearwardly, like the two members of the transverse bar K′, and the faces of the two plows ascend rearwardly and converge toward the middle of the machine, where the two plows are separated by an intervening space $i^2$.

L represents rearwardly and upwardly extending guide-plates, which are arranged upon the cross-bar K′ in rear of the plowshares at substantially the same angle at which the faces of the plowshares are arranged.

The plow-frame is suspended at its front end from the main frame by any suitable means in such manner that the plows can be adjusted up or down to regulate the depth of the cut or can be carried above the level of the ground when not required for use, as in going to or from the field. The devices shown for that purpose in the drawings are constructed as follows: The rear ends of the side bars D of the main frame are connected to the rear portions of the side bars K of the plow-frame by horizontal pivots $m$. $n$, Figs. 1, 2, 6, and 7, represents a transverse rock-shaft, which is secured to the front ends of rock-arms $n'$, pivoted at their rear ends by transverse bolts $n^2$ to brackets $n^3$, rising from the side bars D of the main frame. O represents links, which are hung at their upper ends to the rock-shaft $n$ and pivoted at their lower ends to the side bars K of the plow-frame. O' is a toothed locking-segment secured to the upper end of one of the links concentric with the rock-shaft $n$. $O^2$ is a hand-lever which is secured to the rock-shaft adjacent to the segment, and $O^3$ is a pawl attached to the lever and engaging the segment. Upon disengaging the pawl from the segment and swinging the lever the rock-shaft and rock-arms are swung on the pivots of the latter and the links are raised or lowered, thereby raising or lowering the front portion of the plow-frame and the plows correspondingly.

The endless traveling separator or carrier is mounted in the plow-frame in rear of the plowshares I and guide-plates L. As shown in the drawings, particularly Figs. 9, 10, and 11, this separator is constructed as follows: $p$ represents two endless chains arranged lengthwise in the plow-frame, near the inner sides of the side bars thereof, and $p'$ are cross-bars which are secured to the chain-links and spaced so far apart that potatoes of average size will not drop through the spaces between the bars. The chains are preferably arranged to ascend rearwardly and form, with the cross-bars, an endless skeleton apron or carrier, which travels with its upper portion or stretch rearwardly. The apron is supported at its forward end by a transverse shaft $p^2$, which is journaled in the side bars K of the plow-frame just in rear of the guide-plates L and provided with loose disks $p^3$, on which the separator-bars are supported in passing around the front shaft $p^2$. The disks are held spaced apart on the shaft and permitted to yield laterally by spiral springs $q$, which surround the shaft and are interposed between the disks. This construction permits the disks to yield laterally and prevents breakage in case a stone or other obstacle gets between the disks and the separator-bars. The separator is driven at its upper or rear end, where the separator-apron passes around sprocket-wheels $p^5$, secured to a transverse rear shaft $p^4$, which is journaled in the side bars of the plow-frame. The teeth of the sprocket-wheels project between and engage the bars of the separator-apron, and as these wheels are rotated in the direction of the arrow, Fig. 10, they drive the separator-apron in such direction that the front portion of the apron moves upwardly in passing around the front shaft and the upper stretch of the apron moves rearwardly.

The endless separating-apron is wider than the distance between the outer edges of the plows, so that the separator extends laterally beyond the outer edges of the plows, as most clearly shown in Figs. 2 and 9. This permits the earth or furrow-slice which is elevated by the plows to spread laterally upon reaching the separator, whereby the layer of earth is reduced in thickness and increased in width on the separator, thereby improving the separation, reducing the resistance, and leveling the surface of the row behind the machine.

The rear shaft $p^4$ of the separator-apron is driven from an intermediate shaft $r$, arranged above the apron on the main frame, and this intermediate shaft is driven from both the front and rear axles by suitable mechanism. The driving devices shown in the drawings are constructed as follows: The intermediate shaft $r$ is journaled in bearings $r'$, formed in standards $r^2$, rising from the side bars D of the main frame, and is connected to the rear separator-shaft $p^4$ on each side of the machine by a sprocket-chain $r^3$, running around sprocket-wheels $r^4$ $r^5$, respectively, fixed on the shafts $r$ and $p^4$. R represents tightener-wheels which are mounted in the upper ends of levers R', pivoted intermediate of their ends to the side bars D of the main frame. Tension is applied to the lower ends of these levers by spiral springs $R^2$, connecting the lower ends of the levers to suitable parts of the machine, such as the side bars of the plow-frame. By this means the driving sprocket-chains are kept taut irrespective of the position to which the plow-frame is adjusted. If desired, the separator can be driven from the intermediate shaft by a single sprocket-chain.

S represents a drive-chain running around sprocket-wheels S' $S^2$, respectively, secured to the main portion A of the front axle and the rear axle. The lower stretch of the chain passes over a sprocket-wheel $S^3$, secured to the intermediate shaft $r$. The upper stretch of the chain is held taut and clear of the intermediate shaft and the sprocket-wheel $S^3$ thereon by an idle sprocket-wheel $S^4$, which is supported by a shaft $S^5$, mounted in arms rising from the standards $r^2$.

T represents two bars which extend longitudinally and edgewise over the separator-apron, near the sides thereof. These bars are preferably formed of flat bar-steel of suitable cross-section. Each bar is secured at its front end to the adjacent side bar of the plow-frame at or near the outer side of the adjacent plow and extends upwardly and rearwardly from its point of attachment, so that its inclined or curved front portion operates as a cutter or colter, cutting vertically through the side of the furrow-slice cut by the plow and separating the same from the standing land. Each bar is unsupported in rear of its front fastening and is arranged at such a height above the bars of the separator-apron that a flow-space is formed underneath each bar through which the loose earth on the separator can spread out and flow outwardly toward the side edge of the separator, which is located at some distance outside of the bar. The bars, however, prevent the vines and potatoes from escaping laterally and confine the same to the space between the bars. As the bars are unsupported in rear of their front ends, no obstruction is formed against which earth, tops, or other material can lodge, and the material on the separator can move freely backward, both underneath and on the inside and outside of the bars.

U, Figs. 2, 9, 10, and 11, represents a cleaner or scraper which is arranged beneath the lower stretch of the separator-apron for cleaning the cross-bars thereof. This scraper has the form of a bow which is arranged transversely with its convex side forwardly and is secured at its ends to the side bars K of the plow-frame by upright bent arms U'. This scraper is arranged underneath the front portion of the separator and has its ends beveled on their upper sides, so that the cross-bars of the lower stretch of the separator-apron in moving forwardly pass upon and over this scraper, whereby clods of earth or other substances which may adhere to the cross-bars are scraped or raked from the same.

V, Figs. 1, 2, and 6, represents vine gathering or alining arms which are arranged in the front part of the machine in front of the plows and in line with the outer ends thereof for straightening the vines before the plows reach the same. As shown in the drawings, these arms are mounted on the main portion A of the front axle by collars v, which are arranged on the inner sides of the frame-plates a' and from which the arms extend forwardly over the cross-bar H and downwardly in front of the latter. The arms rest on this cross-bar in their lowermost position and are free to rise and fall above the cross-bar by their pivotal connection with the front axle.

The operation of the machine is as follows: In drawing the machine forwardly the forward rotation of the front and rear ground-wheels is transmitted to the main portion of the front axle and to the rear axle, and the forward rotation of these axles drives the spocket-chain S, so that the lower stretch thereof moves rearwardly. This chain rotates the intermediate shaft in the proper direction to drive the separator with the upper portion of the latter running rearwardly. The bars of the separator move upwardly at the front end thereof immediately in rear of the plows and guide-plates and catch the earth and potatoes as they are delivered by the guide-plates. The bars of the separator in their upward movement exert a beating action which detaches the adhering earth from the potatoes and the latter from the vines to which they may adhere. The potatoes of average size and the vines tail off over the rear end of the separator, while the earth and small potatoes fall through between the bars of the separator. As the separator is driven from all four ground-wheels instead of a single pair, the traction is greatly increased and the machine is enabled to operate on a much heavier load or greater quantity of material, thereby adapting the machine for use in localities where the tubers are planted comparatively deep in the ground. The drive-wheels can also be made narrower, and consequently lighter. As the main portion of the front axle is mounted in fixed bearings on the frame and the front wheels are free to swing independently thereof, the machine can be turned without affecting the relation of the drive chains and wheels.

As the front wheels are mounted to turn on the sleeves or bearings in which the end portions of the front axles are journaled, these end portions are relieved from the friction and strains which are applied by the front wheels directly to these bearings. The space between the adjacent inner ends of the plowshares forms a passage through which earth, vines, and other material can pass rearwardly to the separator and prevents the plows from becoming clogged. As the two plows converge rearwardly they deflect the loosened material toward the center of the machine in elevating the material and deliver the material near the middle of the separator, whereby the earth is prevented from reaching the sides of the separator before having been fully subjected to the separating action.

I claim as my invention—

1. The combination of a front axle, a rear axle, ground-wheels connected with said axles, a separator, and driving mechanism connecting said separator with both axles, substantially as set forth.

2. The combination of a front axle, a rear axle, ground-wheels connected with said axles, a plow, a separator arranged in rear of the plow, and driving mechanism connecting said separator with both axles, substantially as set forth.

3. The combination of a front axle, a rear axle, ground-wheels connected with said axles, a separator, an intermediate shaft arranged above said separator, driving mechanism connecting said intermediate shaft with said separator, and driving mechanism connecting both axles with said intermediate shaft, substantially as set forth.

4. The combination of a main frame, a rear axle and rear wheels, a front axle composed of a main portion which is journaled in said main frame and end portions which are movably coupled to said main portion, movable steering-frames in which said end portions of the front axle are journaled, front wheels connected with the end portions of the front axle, a separator, and driving mechanism connecting the main portion of the front axle with said separator, substantially as set forth.

5. The combination of a main frame, a rear axle, and rear wheels, a front axle composed of a main portion which is journaled in said main frame and end portions which are movably coupled to said main portion, movable steering-frames provided with bearings in which said end portions of the front axle are journaled, front wheels mounted to turn on said bearings and connected with the end portions of the front axle, a separator, and driving mechanism connecting the main portion of the front axle with said separator, substantially as set forth.

6. The combination of a main frame, a rear axle journaled in the same, rear wheels connected with said axle, a front axle composed of a main portion which is journaled in said main frame and end portions which are movably coupled to said main portion, movable steering-frames in which the end portions of the front axle are mounted, an intermediate shaft supported in the main frame, sprocket-wheels mounted respectively upon the main portion of the front axle, the rear axle and said intermediate shaft, a drive-chain connecting said sprocket-wheels, a separator, and transmitting mechanism connecting said intermediate shaft with said separator, substantially as set forth.

7. The combination of a plow-frame having side bars and a transverse connecting front bar having two rearwardly-converging members, rearwardly-converging plowshares secured to the converging members of said cross-bar, and a separator arranged in rear of said cross-bar, substantially as set forth.

8. The combination of a plow-frame having side bars and a transverse connecting front bar provided with two rearwardly-converging members having forwardly-sloping front sides, rearwardly-converging plowshares secured upon the sloping front sides of the members of said cross-bar, and a separator arranged in rear of said cross-bar, substantially as set forth.

9. The combination of a main frame, a plow-frame which is pivotally supported at its rear end in the main frame and capable of vertical movement at its front end and which is provided near its front end with a transverse connecting-bar having two rearwardly-converging members, and rearwardly-converging plowshares secured to the converging members of said cross-bar, substantially as set forth.

10. The combination of a plow, a separator in rear of the same and extending laterally beyond the sides thereof, and side bars extending lengthwise over the separator approximately in line with the outer sides of the plow, said bars being arranged above the separator and separated therefrom by a flow-space through which the earth can flow outwardly toward the side of the separator, and said bars being secured at their front ends and free in rear thereof, forming unobstructed guides along which the material can flow freely rearwardly over the separator, substantially as set forth.

11. The combination of a plow, a separator in rear of the same and extending laterally beyond the sides thereof, and side bars secured at their front ends and free in rear thereof, said bars rising from their fixed front ends, forming front cutter portions, and extending from said cutter portions rearwardly above the separator, being separated therefrom by a flow-space underneath the bars, substantially as set forth.

12. In a potato-digger, the combination of a plow, an endless separator-apron arranged in rear of the plow, and a cleaner arranged below the separator and operating upon the lower stretch thereof, substantially as set forth.

13. In a potato-digger, the combination of a plow, an endless separator-apron arranged in rear of the plow, and a bow-shaped cleaner arranged transversely underneath the separator-apron, substantially as set forth.

14. In a potato-digger, the combination of a main frame, a vertically-movable plow-frame, a plow supported by said plow-frame, an endless separator-apron arranged in said plow-frame in rear of said plow, and a cleaner secured to said plow-frame and arranged underneath said separator-apron, substantially as set forth.

15. In a potato-digger, the combination of a plow, an endless separator-apron arranged in rear thereof, a front shaft for said separator, disks mounted loosely on said shaft for supporting said apron, and springs which are arranged between said disks and hold the same in position but permit the same to yield laterally, substantially as set forth.

16. In a potato-digger, the combination of a main frame, a plow, a vertically-movable plow-frame carrying the same, and an adjusting means for said plow-frame comprising a transverse shaft, arms fixed to said shaft and pivoted to said main frame, links loosely connected to said shaft and to said plow-frame, a toothed segment fixed to one of said links, a lever fixed to said shaft adjacent to said segment, and a pawl carried by said lever and engaging said segment, substantially as set forth.

17. In a potato-digger, the combination of a main frame, a plow, a separator arranged in rear of the plow, a front axle composed of a main portion, which is journaled in said main frame, and end portions which are movably coupled to said main portion, steering-frames in which the end portions of the axle are journaled, a transverse bar connecting said steering-frames, and vine-straightening arms which are hung upon said main portion of the axle and extend therefrom forwardly over said transverse bar and downwardly in front of the latter, substantially as set forth.

18. The combination of a main frame, a plow, a rear axle and rear wheels, a front axle, front wheels coupled to the front axle, and a draft device attached to the front portion of the main frame by a pivotal connection which is arranged above and in rear of the front axle, substantially as set forth.

19. The combination of a main frame, a plow, a rear axle and rear wheels, a front axle, front wheels coupled to the front axle, a pole-frame arranged above the front axle and connected with the front portion of the main frame by transverse pivots, and a pole connected with the pole-frame by a vertical pivot, substantially as set forth.

Witness my hand this 2d day of January, 1902.

CHARLES J. CUMMINGS.

Witnesses:
WILLIS MAINE,
HOWARD E. MARSDEN.